US010419941B2

(12) United States Patent
Xu et al.

(10) Patent No.: US 10,419,941 B2
(45) Date of Patent: Sep. 17, 2019

(54) SENDING METHOD, DEVICE, AND ACCESS POINT FOR OCCUPYING AN UNLICENSED CARRIER

(71) Applicant: ZTE CORPORATION, Shenzhen (CN)

(72) Inventors: Hanqing Xu, Shenzhen (CN); Can Liu, Shenzhen (CN); Yajun Zhao, Shenzhen (CN); Linmei Mo, Shenzhen (CN)

(73) Assignee: ZTE CORPORATION (CN)

( * ) Notice: Subject to any disclaimer, the term of this patent is extended or adjusted under 35 U.S.C. 154(b) by 233 days.

(21) Appl. No.: 15/505,749

(22) PCT Filed: Jan. 22, 2015

(86) PCT No.: PCT/CN2015/071336
§ 371 (c)(1),
(2) Date: Feb. 22, 2017

(87) PCT Pub. No.: WO2015/131694
PCT Pub. Date: Sep. 11, 2015

(65) Prior Publication Data
US 2017/0272957 A1    Sep. 21, 2017

(30) Foreign Application Priority Data

Aug. 22, 2014    (CN) .......................... 2014 1 0419438

(51) Int. Cl.
*H04W 16/14*    (2009.01)
*H04W 74/08*    (2009.01)
(Continued)

(52) U.S. Cl.
CPC ........... *H04W 16/14* (2013.01); *H04W 72/04* (2013.01); *H04W 74/0816* (2013.01);
(Continued)

(58) Field of Classification Search
CPC . H04W 16/14; H04W 74/0816; H04W 76/20; H04W 72/04; H04W 48/08; H04W 92/02
See application file for complete search history.

(56) References Cited

U.S. PATENT DOCUMENTS 9,184,886 B2    11/2015    Bontu et al.
2013/0294356 A1    11/2013    Bala et al.
(Continued)

FOREIGN PATENT DOCUMENTS

CN    101242333 A    8/2008
CN    101754242 A    6/2010
(Continued)

OTHER PUBLICATIONS

Alireza Babaei (Cablelabs), "Impact of LTE in Unlicensed Spectrum on Wi-Fi", Dated Jul. 15, 2014, Doc.: IEEE 802.19-14/0037r1, XP068070063, 13 Pages.
(Continued)

*Primary Examiner* — Joseph E Dean, Jr.
(74) *Attorney, Agent, or Firm* — McDonald Hopkins LLC

(57) ABSTRACT

Provided are a method and a device for sending by occupying an unlicensed carrier, and an access point. The method includes that an access point occupies an unlicensed carrier according to a continuous occupation mode and sending data and/or signals on the unlicensed carrier; or the access point occupies the unlicensed carrier according to the continuous occupation mode or an ordinary mode and sends a downlink reference signal on the unlicensed carrier according to a preset policy. The technical solution provided by the present document can reduce the time needed for the access point to process operations such as synchronization and CSI acquisition other than data sending after the access point preempts a resource at each time.

9 Claims, 3 Drawing Sheets

(51) Int. Cl.
  *H04W 76/20* (2018.01)
  *H04W 72/04* (2009.01)
  *H04W 48/08* (2009.01)
  *H04W 92/02* (2009.01)

(52) U.S. Cl.
  CPC ............ *H04W 76/20* (2018.02); *H04W 48/08* (2013.01); *H04W 92/02* (2013.01)

(56) References Cited

U.S. PATENT DOCUMENTS

| | | |
|---|---|---|
| 2014/0036881 A1 | 2/2014 | Kim et al. |
| 2014/0140314 A1 | 5/2014 | Wei et al. |
| 2015/0098412 A1* | 4/2015 | Yerramalli ............ H04W 16/14 370/329 |

FOREIGN PATENT DOCUMENTS

| | | |
|---|---|---|
| CN | 102843696 A | 12/2012 |
| CN | 103580840 A | 2/2014 |
| GB | 2497556 A | 6/2013 |
| WO | 2013071488 A1 | 5/2013 |

OTHER PUBLICATIONS

Extended European Search Report dated Jul. 17, 2017, Application No. 15758416.0-1857 / 3197222, Applicant ZTE Corporation, 8 Pages.

Office Action dated Jan. 23, 2018 for Japanese Patent Application No. 2017-529121.

PCT International Search Report dated May 28, 2015, Application No. PCT/CN2015/071336, 3 Pages.

* cited by examiner

SENDING METHOD, DEVICE, AND ACCESS POINT FOR OCCUPYING AN UNLICENSED CARRIER

CROSS-REFERENCE TO RELATED APPLICATIONS

This application is a U.S. national phase of PCT Application No. PCT/CN2015/071336 filed on Jan. 22, 2015, which claims priority to Chinese Patent Application No. 201410419438.3 filed on Aug. 22, 2014, the disclosures of which are incorporated in their entirety by reference herein.

TECHNICAL FIELD

The present document relates to the technical field of sending by occupying an unlicensed carrier, in particular to a method and a device for sending by occupying an unlicensed carrier, and an access point.

BACKGROUND

Long Term Evolution Unlicensed (LTE-U) refers to deploying LTE in unlicensed spectrums to satisfy sharply increasing capacity demands of an LTE system and improve the use efficiency of unlicensed spectrums, and is one of possible important evolution directions of LTE and future wireless communication. When LTE-U is designed, it needs to consider about how to fairly and friendly contend with different systems such as Wireless Fidelity (WiFi) and radar and identical LTE-U systems for unlicensed spectrums to perform data transmission on a premise that LTE technical features are not influenced and are reserved as much as possible. According to the expression of 3GPP standard conference, an LTE-U system may also be called as an LTE Licensed Assisted Access (LAA) system. At present, modes for LAA/LTE-U to use unlicensed spectrums include Carrier Aggregation Supplemental Downlink (CA SDL), Carrier Aggregation Time Division Duplex (CA TDD) and Stand-alone modes, wherein CA SDL is a mainstream mode at present.

After an unlicensed carrier access point or base station preempts a resource at each time, a series of processes such as synchronization, downlink receiving, Channel State Information (CSI) measurement, uplink feedback and scheduling need to be performed, and this will occupy much time from several milliseconds to more than ten milliseconds. However, a maximum continuous occupation time length of unlicensed carriers which are under control is approximate tens of milliseconds, which are generally different in different regions. In other words, a quite large part of a time resource which is preempted by the unlicensed carrier access point or base station at each time is used for processing operations other than data sending, and this greatly reduces the spectrum use efficiency and performance of the system. However, no corresponding solution has been provided in the related technology on how to reduce the proportion of the overhead of the above-mentioned processes in the preempted resource.

SUMMARY

The technical problem which needs to be solved by the present document is to provide a method and a device for sending data and/signals by occupying an unlicensed carrier, and an access point, so as to reduce the time needed for the access point to process operations such as synchronization and CSI acquisition other than data sending after the access point preempts a resource at each time.

In order to solve the above-mentioned technical problem, the following technical solution is adopted:

A method for sending by occupying an unlicensed carrier includes the following steps.

An access point occupies an unlicensed carrier according to a continuous occupation mode and sends data and/or signals on the unlicensed carrier;

Or the access point occupies the unlicensed carrier according to the continuous occupation mode or an ordinary mode and sends a downlink reference signal on the unlicensed carrier according to a preset policy.

Alternatively, the step of the access point occupying the unlicensed carrier according to the continuous occupation mode and sending the data and/or signals on the unlicensed carrier includes as follows.

One or more sub-occupation periods are set and a monitoring interval is configured after each sub-occupation period.

Data and/or signals on the unlicensed carrier occupied in the one or more sub-occupation periods are sent and the data and/or signals in the monitoring interval are stopped sending.

The access point is always kept to have an occupation and connection relationship with UE served by the access point in a continuous occupation period, herein the continuous occupation period refers to a time period that the access point actually occupies or virtually occupies the unlicensed carrier.

Alternatively, the step of the access point occupying the unlicensed carrier according to the continuous occupation mode and sending the data and/or signals on the unlicensed carrier further includes as follows.

If the access point and/or the UE completely sends the data and/or signals in one of the sub-occupation periods, releasing the unlicensed carrier and the access point terminating continuous occupation at a current time.

The continuous occupation period includes an actual time length spent in completely sending the data and/or signals.

Alternatively, the step of the access point occupying the unlicensed carrier according to the continuous occupation mode and sending the data and/or signals on the unlicensed carrier further includes as follows.

If the unlicensed carrier further needs to be continuously occupied after one of the sub-occupation periods is ended and the access point finds that the unlicensed carrier is still idle within a duration of the monitoring interval configured after the sub-occupation period or the access point preempts the unlicensed carrier again, after the monitoring interval is ended, the access point continuously sends the data and/or signals which are not completely sent in one or more sub-occupation periods after the monitoring interval.

The continuous occupation period includes a total time length of a plurality of sub-occupation periods and a plurality of monitoring intervals in which all data and/or signals are completely sent.

Alternatively, the step of the access point occupying the unlicensed carrier according to the continuous occupation mode and sending the data and/or signals on the unlicensed carrier further includes as follows.

If the unlicensed carrier further needs to be continuously occupied after one of the sub-occupation periods is ended but the access point does not preempt the unlicensed carrier again in a duration of the monitoring interval configured after the sub-occupation period, starting a first timer after the monitoring interval is ended, and if the access point preempts the unlicensed carrier again in set time of the first timer, the access point and/or the UE continuously sends the data and/or signals which are not completely sent in one or more subsequent sub-occupation periods.

The continuous occupation period includes a total time length of waiting time for waiting to preempt the unlicensed carrier again within the set time of the first timer, and a plurality of sub-occupation periods and a plurality of monitoring intervals in which all data and/or signals are completely sent.

Alternatively, the method further includes the following step.

If the access point does not preempt the unlicensed carrier again in the set time of the first timer, the access point terminates continuous occupation at a current time.

Alternatively, the method further includes the following step.

If the access point has data and/or signals which are not sent before the monitoring interval, the data and/or signals are temporarily cached and the data and/or signals are sent in a next sub-occupation period.

Alternatively, the method further includes the following steps.

The access point starts a second timer after all data and/or signals are completely sent, judging whether there is a subsequent sending occupation demand within set time of the second timer. If there is a subsequent sending occupation demand within the set time of the second timer and the current sub-occupation period for occupying the unlicensed carrier is not ended or the sub-occupation period is ended but the access point preempts the unlicensed carrier again, the unlicensed carrier is continuously occupied, herein the continuous occupation period further includes waiting time for waiting an occupation demand in the set time of the second timer.

If there is no subsequent sending occupation demand in the set time of the second timer or the sub-occupation period is ended but the access point does not preempt the unlicensed carrier again, the access point terminates occupation at a current time.

Alternatively, before the access point occupies the unlicensed carrier according to the continuous occupation mode, the method further includes the following steps.

Configuration parameters of the continuous occupation mode are configured,

Herein the configuration parameters of the continuous occupation mode include one or more of the following information: sub-occupation period, monitoring interval, set time of first timer, set time of second timer, predicted sending time length of data and predicted total time length of continuous occupation.

Alternatively, the method further includes the following step.

The access point notifies the UE served by the access point about the configuration parameters of the continuous occupation mode and an occupation situation, herein the occupation situation includes that the unlicensed carrier is capable of being occupied and is not capable of being occupied.

Alternatively, the step of the access point notifying the UE served by the access point about the occupation situation includes as follows.

The access point sends the occupation situation to the UE in an explicit or implicit mode when any one of the following situations occurs.

A stage when a first sub-occupation period starts, after the monitoring interval is ended at each time, after waiting time within which the unlicensed carrier is preempted again in the set time of the first timer, when timing of the first timer is completed, after waiting time within which a subsequent sending occupation demand is awaited and the sub-occupation period is not ended or the sub-occupation period is ended but the access point preempts the unlicensed carrier again in the set time of the second timer, and when timing of the second timer is completed.

Herein the explicit mode includes that: the access point carries information that indicates whether the unlicensed carrier is capable of being occupied in Downlink Control Information DCI or Media Access Control MAC signaling and sends the DCI or MAC signaling to the UE, and the implicit mode includes that: if the access point finds that the unlicensed carrier is still idle or the access point preempts the unlicensed carrier again, the access point sends a reference signal to the UE after any one of the situations occurs, and if the access point does not preempt the unlicensed carrier, the access point does not send the reference signal.

Alternatively, the method further includes the following steps.

If the unlicensed carrier further needs to be continuously occupied after one of the sub-occupation periods is ended but the access point does not preempt the unlicensed carrier again in the duration of the monitoring interval, the access point carrying information that indicates the UE to start a first timer in DCI or MAC signaling and sending the DCI or MAC signaling to the UE.

Or after all data and/or signals are completely sent, the access point carrying information that indicates the UE to start a second timer in DCI or MAC signaling and sending the DCI or MAC signaling to the UE.

Alternatively, the step of the access point notifying the UE served by the access point about the configuration parameters of the continuous occupation mode includes as follows.

The access point sends the configuration parameters of the continuous occupation mode to the UE through a licensed carrier or the preempted unlicensed carrier.

The access point and the UE are uniformly preconfigured with partial configuration parameters. Herein the partial configuration parameters include sub-occupation period, monitoring interval, set time of first timer and set time of second timer. The access point sends predicted sending time length of data and predicted total time length of continuous occupation to the UE through a licensed carrier or the preempted unlicensed carrier.

Alternatively, the step of the access point sending the downlink reference signal on the unlicensed carrier according to the preset policy includes as follows.

The sending of the downlink reference signal for channel measurement is triggered on a first available subframe or a second available subframe of a first sub-occupation period of the unlicensed carrier.

Alternatively, after triggering the sending of the downlink reference signal for one time on the first available subframe or the second available subframe of the first sub-occupation period of the unlicensed carrier, the method further includes:

continuously sending the downlink reference signal in one or more next subframes for many times.

Alternatively, the step of the access point sending the downlink reference signal on the unlicensed carrier according to the preset policy includes adjusting an initial moment for sending the periodically sent downlink reference signal to a first available subframe or a second available subframe of a first sub-occupation period of the unlicensed carrier.

Alternatively, if it is monitored that the unlicensed carrier is idle before the unlicensed carrier is occupied, the downlink reference signal is forcibly sent on the unlicensed carrier. Or regardless of whether it is monitored that the unlicensed carrier is idle, the downlink reference signal is forcibly sent on the unlicensed carrier.

Alternatively, the downlink reference signal includes Channel State Information-Reference Signal CSI-RS and Cell-specific Reference Signal CRS.

Alternatively, the method further includes the following steps.

After the sending of the data and/or signals is stopped within a preset time period, the access point performs data channel coding modulation by using CSI reported by the UE at the most recent time.

A device for sending by occupying an unlicensed carrier includes an occupation module and a sending module. Herein the occupation module is arranged to occupy an unlicensed carrier according to a continuous occupation mode.

The sending module is arranged to send data and/or signals on the unlicensed carrier;

Or the occupation module is arranged to occupy the unlicensed carrier according to the continuous occupation mode or an ordinary mode The sending module is arranged to send a downlink reference signal on the unlicensed carrier according to a preset policy.

Alternatively, the occupation module is arranged to occupy the unlicensed carrier according to the continuous occupation mode in accordance with the following mode: setting one or more sub-occupation periods and configuring a monitoring interval after each sub-occupation period.

The sending module is arranged to send the data and/or signals on the unlicensed carrier according to the following mode.

Data and/or signals are sent on the unlicensed carrier occupied within the one or more sub-occupation periods and the data and/or signals in the monitoring interval are stopped sending.

The access point is always kept to have an occupation and connection relationship with UE served by the access point within a continuous occupation period, herein the continuous occupation period refers to a time period that the access point actually occupies or virtually occupies the unlicensed carrier.

Alternatively, the occupation module is further arranged to be as follows.

If the sending module completely sends the data and/or signals within one of the sub-occupation periods, the unlicensed carrier is released and continuous occupation at a current time is terminated.

The continuous occupation period includes an actual time length spent in completely sending the data and/or signals.

Alternatively, the occupation module is further arranged to, if the unlicensed carrier further needs to be continuously occupied after one sub-occupation period is ended and it is found that the unlicensed carrier is still idle or the unlicensed carrier is occupied again within a duration of the monitoring interval configured after the sub-occupation period, after the monitoring interval is ended, notify the sending module to continuously send the data and/or signals which are not completely sent within one or more sub-occupation periods after the monitoring interval.

The sending module is further arranged to, after a notification of the occupation module is received, continuously send the data and/or signals which are not completely sent in one or more sub-occupation periods after the monitoring interval.

The continuous occupation period includes a total time length of a plurality of sub-occupation periods and a plurality of monitoring intervals in which all data and/or signals are completely sent.

Alternatively, the device further includes a first timer. Herein the occupation module is further arranged to be as follows. If the unlicensed carrier further needs to be continuously occupied after one of the sub-occupation periods is ended, but the unlicensed carrier is not occupied again within duration of the monitoring interval configured after the sub-occupation period, the first timer is started after the monitoring interval is ended. If the unlicensed carrier is occupied again within set time of the first timer, the sending module is notified to continuously send the data and/or signals which are not completely sent within one or more subsequent sub-occupation periods;

The first timer is arranged to, after started by the occupation module, start timing and notify the occupation module after the set time is out.

The sending module is further arranged to, after a notification of the occupation module is received, the data and/or signals which are not completely sent within one or more subsequent sub-occupation periods are continuously sent.

Herein the continuous occupation period includes a total time length of waiting time for waiting to preempt the unlicensed carrier again within the set time of the first timer, and a plurality of sub-occupation periods and a plurality of monitoring intervals in which all data and/or signals are completely sent.

Alternatively, the occupation module is further arranged to be as follows.

If the unlicensed carrier is not occupied again within the set time of the first timer, continuous occupation at a current time is terminated.

Alternatively, the device further includes a cache module. Herein the sending module is further arranged to, if the sending module has data and/or signals which are not sent before the monitoring interval, the data and/or signals in the cache module are temporarily cached and the data and/or signals are sent within a next sub-occupation period.

The cache module is arranged to catch the data and/or signals which are not completely sent by the sending module.

Alternatively, the device further includes a second timer. Herein the occupation module is further arranged to start the second timer after all data and/or signals are completely sent, judge whether there is a subsequent sending occupation demand within set time of the second timer. If there is a subsequent sending occupation demand within the set time of the second timer and the current sub-occupation period for occupying the unlicensed carrier is not ended, or the sub-occupation period is ended but the unlicensed carrier is occupied again, then the unlicensed carrier are continuously occupied. The continuous occupation period further includes waiting time for waiting an occupation demand in the set time of the second timer. If there is no subsequent sending occupation demand within the set time of the second timer or the sub-occupation period is ended but the unlicensed carrier is not occupied again, then occupation at a current time is terminated.

The second timer is arranged to, after started by the occupation module, timing is started and the occupation module is notified after the set time is out.

Alternatively, the device further includes a parameter configuration module and a parameter notification module. Herein the parameter configuration module is arranged to, before the access point occupies the unlicensed carrier according to the continuous occupation mode, configuration parameters of the continuous occupation mode are configured. Herein the configuration parameters of the continuous occupation mode include one or more of the following information: sub-occupation period, monitoring interval, set time of first timer, set time of second timer, predicted sending time length of data and predicted total time length of continuous occupation.

The parameter notification module is arranged to notify the UE served by the access point about the configuration parameters of the continuous occupation mode and an occupation situation, herein the occupation situation includes that the unlicensed carrier is capable of being occupied and is not capable of being occupied.

Alternatively, the parameter notification module is arranged to notify the UE served by the access point about the occupation situation according to the following mode.

The occupation situation is sent to the UE in an explicit or implicit mode when any one of the following situations occurs: a stage when a first sub-occupation period starts, after the monitoring interval is ended at each time, after waiting time within which the unlicensed carrier is preempted again in the set time of the first timer, when timing of the first timer is completed, after waiting time within which a subsequent sending occupation demand is awaited and the sub-occupation period is not ended or the sub-occupation period is ended but the access point preempts the unlicensed carrier again in the set time of the second timer, and when timing of the second timer is completed.

Herein the explicit mode includes that the parameter notification module carries information that indicates whether the unlicensed carrier is capable of being occupied in Downlink Control Information DCI or Media Access Control MAC signaling and sends the DCI or MAC signaling to the UE. The implicit mode includes that, if it is found that the unlicensed carrier is still idle or the unlicensed carrier is occupied again, the parameter notification module sends a reference signal to the UE after any one of the situations occurs. If the unlicensed carrier is not preempted, the parameter notification module does not send the reference signal.

Alternatively, the parameter notification module is arranged to notify the UE served by the access point about the configuration parameters of the continuous occupation mode according to the following mode.

The parameter notification module sends the configuration parameters of the continuous occupation mode to the UE through a licensed carrier or the preempted unlicensed carrier.

The parameter configuration module and the UE are uniformly preconfigured with partial configuration parameters. Herein the partial configuration parameters include sub-occupation period, monitoring interval, set time of first timer and set time of second time. The parameter notification module sends predicted sending time length of data and total time length of continuous occupation to the UE through a licensed carrier or the preempted unlicensed carrier.

Alternatively, the sending module is arranged to send the downlink reference signal on the unlicensed carrier according to the preset policy according to the following mode.

The sending of the downlink reference signal is triggered for channel measurement on a first available subframe or a second available subframe of a first sub-occupation period of the unlicensed carrier.

Alternatively, the sending module is further arranged to be as follows.

After triggering the sending of the downlink reference signal for one time on the first available subframe or the second available subframe of the first sub-occupation period of the unlicensed carrier, the downlink reference signal in one or more next subframes is continuously sent for many times.

Alternatively, the sending module is arranged to send the downlink reference on the unlicensed carrier according to the preset policy according to the following mode.

An initial moment for sending the periodically sent downlink reference signal is adjusted to a first available subframe or a second available subframe of a first sub-occupation period of the unlicensed carrier.

Alternatively, the sending module is further arranged to be as follows.

If it is monitored that the unlicensed carrier is idle before the unlicensed carrier is occupied, forcibly send the downlink reference signal on the unlicensed carrier.

Regardless of whether it is monitored that the unlicensed carrier is idle, forcibly send the downlink reference signal on the unlicensed carrier.

Alternatively, the downlink reference signal includes Channel State Information-Reference Signal CSI-RS and Cell-specific Reference Signal CRS.

Alternatively, the device further includes a channel modulation module. Herein the channel modulation module is arranged to, after the sending of the data and/or signals is stopped for a preset time period, perform data channel coding modulation by using CSI reported by the UE at the most recent time.

As compared with the related art, according to the method and system for sending data and/or signals by occupying the unlicensed carrier and the access point provided by the technical solution of the present document, the access point uses the contended unlicensed carrier by adopting the above continuous occupation mode, the access point and the UE served by the access point are always kept to have a connection relationship within the continuous occupation period, so that the occupation time length for sending data at each time, i.e., sub-occupation period, can be prevented from exceeding the maximum continuous occupation time length which is controlled by the country. Simultaneously, after the sub-occupation period (or the maximum continuous occupation time length controlled by the country) is ended at each time, the occupation and connection relationship with the UE does not need to be immediately released, thereby the access point does not need to spend time in reestablishing a connection with the UE, e.g., synchronization or measurement time, thereby reducing the time needed for the access point to process operations (such as synchronization, UE measurement and CSI reporting, etc.) other than data sending after the access point preempts the resource at each time. During the monitoring interval, the access point keeps the unchanged connection relationship with the UE, forming virtual occupation on the unlicensed carrier, temporarily not sending uplink and downlink signal, so as to avoid contending or preempting for other access points, so that the rule of fair contention can be guaranteed, and identical systems and different systems are allowed to have enough time to contend for resources.

SPECIFIC EMBODIMENTS

The embodiments of the present document will be described below in detail with reference to the drawings. It shall be illustrated that the embodiments in the present application and the features in the embodiments may be mutually and freely combined under the situation of no conflict.

Embodiment 1

Figure 1:
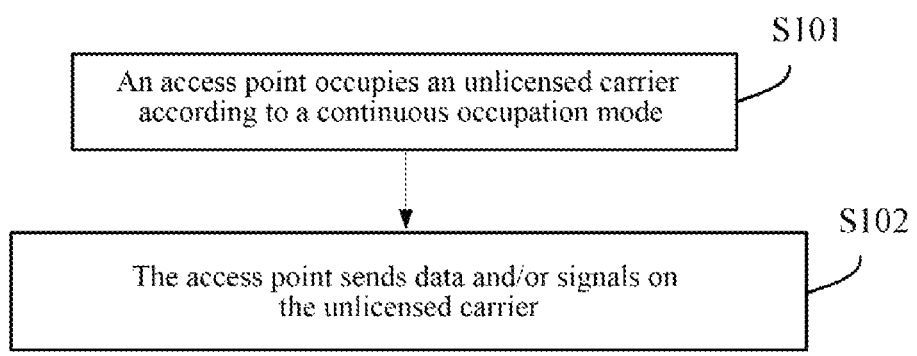
FIG. 1 illustrates a flowchart of a method for sending by occupying an unlicensed carrier in embodiment 1 of the present document.

As illustrated in FIG. 1, this embodiment provides a method for sending by occupying an unlicensed carrier, including the following steps:

In step S101, an access point occupies an unlicensed carrier according to a continuous occupation mode.

Herein, the access point involved in the present embodiment may be an LTE unlicensed carrier access point deployed according to a CA SDL, CA TDD, dual-connection or Standalone deployment mode.

The access point occupies an unlicensed carrier by measuring and sensing a sensing signal of the unlicensed carrier, through a concept similar to WiFi contention fallback and conflict avoidance or a UE-based and network-assisted resource contention mechanism, and based on a fair and friendly rule.

In step S102, the access point sends data and/or signals on the unlicensed carrier.

Herein, one or more sub-occupation periods are set, the time length of a sub-occupation period is smaller than or equal to the controlled maximum continuous occupation time length of the unlicensed carrier, and the controlled maximum continuous occupation time length of the unlicensed carrier is the maximum occupation time of using the unlicensed carrier at each time. For countries or regions which do not arrange the controlled time length, the sub-occupation period may be arranged to be more flexible and longer, but the rule of fair and friendly contention needs to be considered at the same time. A monitoring interval is configured after each sub-occupation period and is used for providing an opportunity for other systems (including identical systems or different systems) to fairly contend with this access point for resources.

The data and/or signals are sent on the unlicensed carrier which is preempted in the one or more sub-occupation periods, and the sending of the data and/or signals is stopped during the monitoring interval.

Alternatively, the continuous occupation mode refers to that the access point is always kept to have an occupation and connection relationship with UE served by the access point in a continuous occupation period, and the continuous occupation period refers to a time period that the access point actually occupies or virtually occupies the unlicensed carrier. Herein, during the period of the monitoring interval, in principle the UE does not receive the data or signals of the access point (except necessary short signaling such as signaling for the access point to notify the UE about that the unlicensed carrier is contended or is not contended), the access point does not serve the UE during this period but the UE can still be viewed as the UE served by the access point, because the access point has ever served the UE, and still needs to serve the UE if the access point has a sending demand and contends the resource successful again after the monitoring interval. Herein, actual occupation refers to that the data and/or signals are sent on the unlicensed carrier during the sub-occupation period, i.e., the access point occupies the unlicensed carrier and other systems cannot preempt the unlicensed carrier. And virtual occupation refers to that the resource of the unlicensed carrier is not actually occupied to send the data and/or signals during the monitoring interval or waiting time set by a timer, i.e., other systems can preempt the unlicensed carrier, but at this moment, the connection relationship between the access point and the UE is not changed (a synchronization and channel state relationship can be maintained), the unlicensed carrier is virtually occupied, and temporarily no uplink and downlink signals are sent to prevent the contention and preemption of other access points or systems from being influenced.

If the access point and/or the UE have data, signals or measurement reports which are not sent, reported or fed back in time before the monitoring interval, the data, signals or measurement reports may be temporarily cached.

For example, if the controlled maximum continuous occupation time length of the unlicensed carrier is $T_{limit}$, (e.g., 32 ms), the sub-occupation period of the unlicensed carrier access point 1 at each time may be set as $T_{sub}$, and $T_{sub}$ may be equal to or slightly smaller than $T_{limit}$, (e.g., $T_{sub}$ may be set as 32 ms or 30 ms). For countries or regions which do not arrange the controlled time length, the preempted unlicensed carrier may also be occupied by adopting the continuous occupation mode to send the data and/or signals, the sub-occupation period may be arranged to be more flexible and longer, but the rule of fair and friendly contention needs to be considered at the same time, and specifically a reference needs to be made to the spectrum use policies of the countries or regions.

If the predicted sending time length $T_{data}$ of data to be sent by the unlicensed carrier access point 1 is greater than the sub-occupation period $T_{sub}$, the access point 1 may be configured with a monitoring interval $T_{space}$ after each $T_{sub}$ to stop sending the data, which is used for providing an opportunity for other systems (including identical systems or different systems) to contend fairly with this access point for the unlicensed carrier, and within this interval, the access point 1 is still kept to have an occupation and connection relationship with the UE served by the access point 1. $T_{space}$ may be set as a slightly small value, e.g., a time length of about one subframe, and not only does the preemption time length, (which is generally tens of us), for the identical systems and the different systems need to be guaranteed, but also relationships such as time frequency synchronization and CSI between the access point 1 and the UE also need to be maintained. Within a duration of $T_{space}$, if the access point 1 finds that the unlicensed carrier is still idle or the access point 1 preempts the unlicensed carrier again, the access point 1 may continuously use configuration parameters before the monitoring interval unless the parameter is updated. The configuration parameters here refer to corresponding parameters set for sending a data channel, a control channel and a signal in a previous sub-occupation period. Unless otherwise it is necessary to make a modification (here the reason to modify the parameter is the same as the reason for modifying the parameters in the sub-occupation period, i.e., parameter modification is not caused by the monitoring interval), these parameters may be continuously used in a next sub-occupation period.

The unlicensed carrier access point adopts the above-mentioned continuous occupation mode such that the time needed for operations such as synchronization, UE measurement and CSI reporting after the access point preempts the resource at each time can be reduced.

With respect to the continuous occupation mode, there may be four scenarios as follows.

Scenario 1

Figure 2:
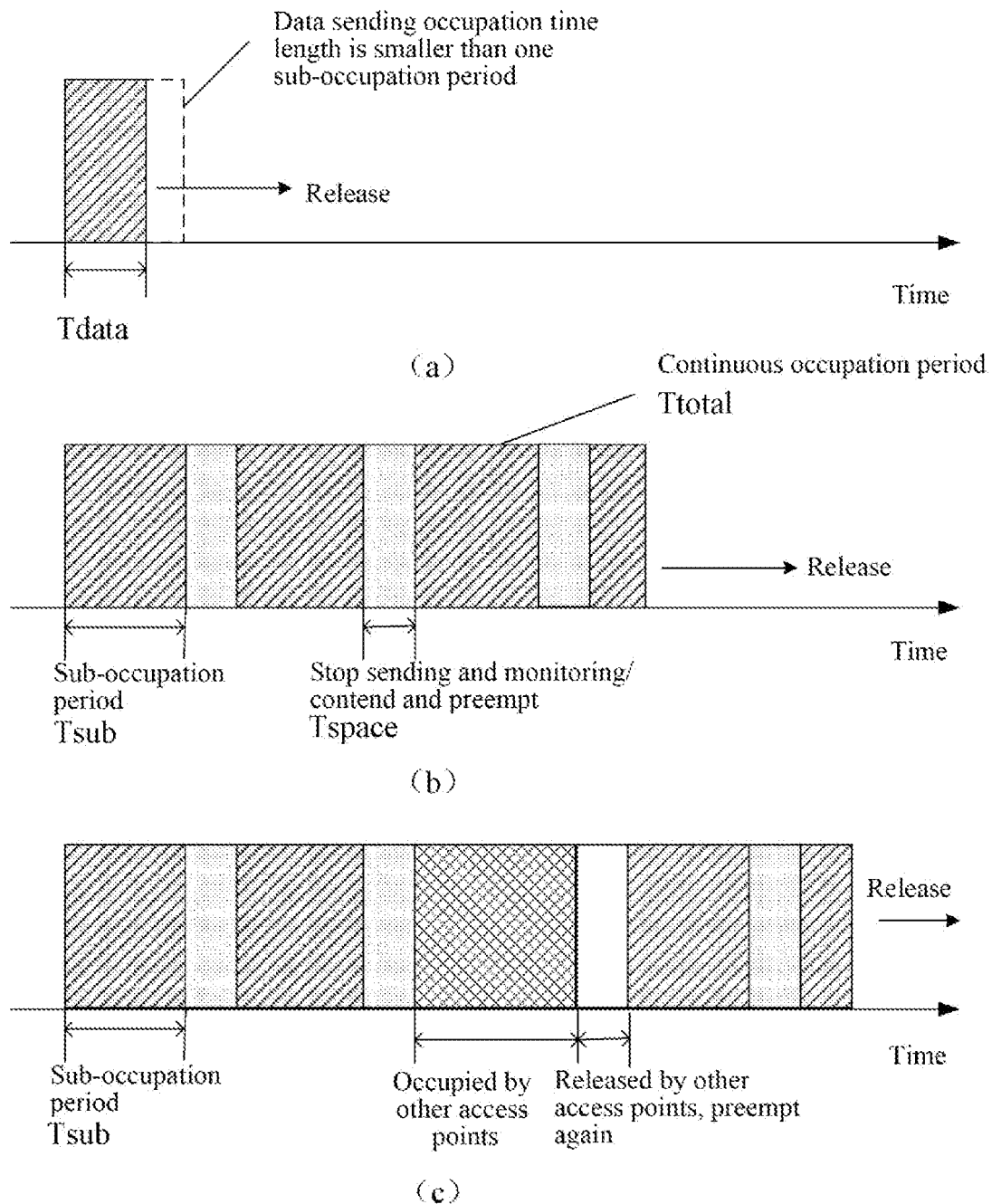
FIG. 2 illustrates a schematic diagram of four scenarios of a continuous occupation mode in embodiment 1 of the present document.

As illustrated in FIG. 2(a), if the predicted sending time length $T_{data}$ of data to be sent by the access point 1 is smaller than one sub-occupation period $T_{sub}$, after the access point 1 completely sends the data, the unlicensed carrier may be immediately released such that other access points may preempt the unlicensed carrier, and the access point terminates continuous occupation at a current time. The continuous occupation period includes an actual time length in which the data and/or signals are completely sent, i.e., the continuous occupation time length $T_{total}$ of the access point 1 is equal to $T_{data}$.

Scenario 2

As illustrated in FIG. 2(b), if the unlicensed carrier further needs to be occupied after one sub-occupation period is ended, i.e., the predicted sending time length $T_{data}$ of data to be sent by the access point 1 is greater than one sub-occupation period $T_{sub}$, and there is no other access points which preempt the unlicensed carrier within each monitoring interval, i.e., the unlicensed carrier is still idle, or the access point 1 preempts the unlicensed carrier again within the monitoring internal in which the sending is stopped. After the monitoring interval is ended, the access point and/or the UE continuously sends the data and/or signals which are not completely sent in one or more sub-occupation periods after the monitoring interval. The access point is always kept to have an occupation and connection relationship with UE served by the access point within a continuous occupation period. Herein the continuous occupation period includes a plurality of sub-occupation periods and a plurality of monitoring intervals in which all data and/signals are completely sent, and the total time length $T_{total}$ of the continuous occupation period of the access point 1 is:

$$T_{total} = T_{data} + \left\lfloor \frac{T_{data}}{T_{sub}} \right\rfloor * T_{space} \quad (1)$$

herein $\lfloor \ \rfloor$ denotes rounding down.

In addition, as an alternative mode, after the monitoring interval is ended, the access point may continuously use the configuration parameters before the monitoring interval to send the data and/or signals which are not completely sent within one or more sub-occupation periods after the monitoring interval. Herein the configuration parameters before the monitoring interval refer to parameters set for sending a data channel, a control channel and a signal within a previous sub-occupation period.

Scenario 3

As illustrated in FIG. 2(c), if the unlicensed carrier needs to be further occupied after one sub-occupation periods is ended, i.e., the predicted sending time length $T_{data}$ of data to be sent by the access point 1 is greater than one sub-occupation period $T_{sub}$ and the data of the access point 1 are not completely sent, but if the unlicensed carrier is preempted by other access points in the monitoring interval $T_{space}$, i.e., the access point 1 does not preempt the unlicensed carrier again, after the monitoring interval is ended, the access point 1 and/or the UE may start the first timer. If the access point 1 preempts the unlicensed carrier again after a waiting time length $T_{wait}$, within a set time length $T_{threshold}$ by the first timer, the access point 1 and the UE may be still kept to have an occupation and connection relationship, and the configuration parameters before the monitoring interval are continuously used to send the data and/or signals which are not completely sent in one or more sub-occupation periods after the monitoring interval, i.e., continuously occupy the unlicensed carrier. In addition to a plurality of sub-occupation periods and a plurality of monitoring intervals in which all data and/or signals are completely sent, the continuous occupation period further includes waiting time $T_{wait}$ for waiting to preempt the unlicensed carrier again in set time of the first timer. Thus, the total time length $T_{total}$ of the continuous occupation period of the access point 1 is:

$$T_{total} = T_{data} + \left\lfloor \frac{T_{data}}{T_{sub}} \right\rfloor * T_{space} + T_{wait} \quad (2)$$

Scenario 4

Still as illustrated in FIG. 2(c), if the unlicensed carrier further needs to be occupied after one sub-occupation period is ended, i.e., the predicted sending time length $T_{data}$ of data to be sent by the access point 1 is greater than one sub-occupation period $T_{sub}$ and the data of the access point 1 are not completely sent, but the unlicensed carrier is preempted by other access points in the monitoring interval $T_{space}$, i.e., the access point 1 does not preempt the unlicensed carrier again, the access point 1 and/or the UE may start the first timer. If the access point 1 does not preempt the unlicensed carrier again within a time length $T_{threshold}$, the access point 1 terminates continuous occupation at a current time. Thus, the total time length $T_{total}$ of the continuous occupation period of the access point 1 is only a time period from a moment before the timing of the timer is ended to a moment when the first sub-occupation period starts. Thereafter, if the resource is preempted again, the access point 1 and the UE need to perform processes such as synchronization, CSI measurement and reporting, and these processes belong to a next continuous occupation period.

In the first three scenarios, after all data and/or signals are completely sent, the method further includes the following operations.

The access point 1 and/or the UE starts the second timer, judges whether there is a subsequent sending occupation demand within set time $T_{threshold}$ of the second timer. If there is a subsequent sending occupation demand and the current sub-occupation period for occupying the unlicensed carrier is not ended, or the sub-occupation period is ended but the access point 1 preempts the unlicensed carrier again, the unlicensed carrier is continuously occupied to send data. Herein the continuous occupation period further includes waiting time $T_{wait}$ for waiting a data sending demand within the set time of the second timer, as shown in formula (3). And if there is no subsequent sending occupation demand or the sub-occupation period is ended but the access point does not preempt the unlicensed carrier again, the access point and the UE terminate occupation at a current time and the continuous occupation period is ended. Thus, the total time length $T_{total}$ of the continuous occupation period of the access point 1 is only a total time length before the timing of the second timer is ended, i.e., the total time length $T_{total}$ of the continuous occupation period as calculated in the first three scenarios.

$$T_{total} = T_{data} + \left\lfloor \frac{T_{data}}{T_{sub}} \right\rfloor * T_{space} + T_{wait} + T'_{wait} \quad (3)$$

In addition, there is another scenario, in which the access point 1 also contends to preempt the unlicensed carrier even though the access point 1 has no data to send at this moment, and the unlicensed carrier is occupied according to the continuous occupation mode after the unlicensed carrier is preempted, i.e., a reference signal is sent within the sub-occupation period, and a monitoring interval is configured after each sub-occupation period to stop sending signals and is used for fair contention for access. This solution is especially suitable for a scenario in which the number of unlicensed access points is small, and can reduce time overhead caused by steps such as synchronization and measurement performed by the access point 1 once there are data which need to be sent.

In addition, before the access point occupies the unlicensed carrier according to the continuous occupation mode in step S101, the method further includes configuring configuration parameters of the continuous occupation mode, herein the configuration parameters of the continuous occupation mode include at least one or more of the following: sub-occupation period, monitoring interval, set time of the first timer, set time of the second timer, predicted sending time length of data and predicted total time length of continuous occupation. Herein, the configuration parameters may be configured by the access point itself and may also be configured by a neighboring access point, or a macro cell, a cluster head or a centralized controller.

Usually, a plurality of cells or access points are gathered together to form a cluster. A management network element of the cluster is usually called as a cluster head or a centralized controller. The cluster head or the centralized controller may correspond to a separate entity network element and may also be a logic network element divided on a related network management device, e.g., a certain access point is designated as the cluster head or the centralized controller.

In the present embodiment, the method further includes the following operation.

The access point notifies the UE served by the access point about the configuration parameters of the continuous occupation mode and an occupation situation, herein the occupation situation includes that the unlicensed carrier is capable of being occupied and is not capable of being occupied. The configuration parameters may be sent before the unlicensed carrier is occupied to send data and may also be sent when the unlicensed carrier is occupied. The occupation situation is notified to the UE when the unlicensed carrier is preempted or is not preempted. In addition, the configuration parameters and the occupation situation may also be notified to the UE through another access point, or a macro cell, a cluster head or a centralized controller.

Herein, the step that the access point notifies the UE served by the access point about the occupation situation of the continuous occupation mode includes the following operation.

The access point sends the occupation situation to the UE, i.e. indicates the UE whether the unlicensed carrier could be continuously occupied, in an explicit or implicit mode when any one of the following situations occurs, and the following is included by the situations.

A stage when the first sub-occupation period starts, after the monitoring interval at each time is ended, after the waiting time within which the unlicensed carrier is preempted again in the set time of the first timer, when timing of the first timer is completed, when there is a subsequent sending occupation demand within the set time of the second timer and the sub-occupation period is not ended or the sub-occupation period is ended but the access point preempts the unlicensed carrier again, and when timing of the second timer is completed.

Herein, the explicit mode includes that information that indicates whether the unlicensed carrier is capable of being occupied can be carried by the access point in Downlink Control Information (DCI), which may be broadcasted by adopting formats such as DCI 1A/3/3A/1C, or is carried in Media Access Control MAC signaling and sent to the UE. The implicit mode includes that, if the access point finds that the unlicensed carrier is still idle or the access point preempts the unlicensed carrier again, the access point sends a reference signal to the UE after any one of the situations occurs, and if the access point does not preempt the unlicensed carrier, the reference signal will not be sent. The UE judges whether the unlicensed carrier is capable of being continuously occupied according to whether the reference signal is detected. Alternatively, quick indication is realized through DCI.

In addition, the method further includes the following operations.

If it is further needed to continuously occupy the unlicensed carrier after one sub-occupation period is ended but the access point does not preempt the unlicensed carrier again within the duration of the monitoring interval, the access point carries information that indicates the UE to start the first timer in DCI or MAC signaling to send to the UE;

or after all data and/or signals are completely sent, the access point carries information that indicates the UE to start the second timer in DCI or MAC signaling to send to the UE.

Herein, the step that the access point notifies the UE served by the access point about the configuration parameters of the continuous occupation mode includes the following operation.

The access point sends the configuration parameters of the continuous occupation mode to the UE through a licensed carrier or the preempted unlicensed carrier; or.

the access point and the UE are uniformly preconfigured with partial configuration parameters, wherein "uniformly" refers to that the parameters configured to the access point and the UE need to be consistent, and the partial configuration parameters include sub-occupation period, monitoring interval, set time of the first timer and set time of the second timer. The access point sends other configuration parameters such as predicted sending time length of data and total time length of continuous occupation to the UE through a licensed carrier or the preempted unlicensed carrier.

In addition, the access point may also decide the predicted continuous occupation time length $T_{max}$, e.g., hundreds of milliseconds, according to a load situation on the unlicensed carrier, and notify the UE served by the access point, such that signaling overhead is reduced and the UE may always perform monitoring and measurement during this period till a next notification is received.

A monitoring pattern (sub-occupation period $T_{sub}$ and monitoring interval $T_{space}$) can allow the UE to know that downlink data and/or signals are sent in subframe $T_{sub}$ and no downlink data and/or signals are sent in subframe $T_{space}$, such that the UE is kept to be synchronized with the access point and normal measurement is not influenced. For operations after $T_{space}$, the UE may keep or quit the occupation and connection relationship with the access point through the explicit or implicit indication of the access point, and the monitoring pattern can guarantee that the behaviors of the access point and the UE are consistent. The continuous occupation time length $T_{total}$ may also be calculated by the UE according to parameters such as $T_{data}$, $T_{sub}$, $T_{space}$, $T_{threshold}$, $T_{wait}$, $T'_{threshold}$ and $T'_{wait}$, and is an uncertain value at the beginning of sending. $T_{data}$ and $T_{total}$ can allow the UE to know about approximate time needed for continuous occupation, and if data are not completely sent, the UE may decide whether to keep the occupation and connection state according to the indication of the access point or by continuously waiting for a time length $T_{space}$ or $T_{threshold}$.

The access point uses the contended unlicensed carrier by adopting the above continuous occupation mode, so that the occupation time length for sending data at each time, i.e., sub-occupation period, can be prevented from exceeding the maximum continuous occupation time length which is controlled by the country. Simultaneously, after the sub-occupation period (or the maximum continuous occupation time length controlled by the country) is ended at each time, the occupation and connection relationship with the UE does not need to be immediately released, thereby the access point does not need to spend time in reestablishing a connection with the UE, e.g., synchronization or measurement time, thereby reducing the time needed for the access point to process operations (such as synchronization, UE measurement and CSI reporting, etc.) other than data sending after the access point preempts the resource at each time. Simultaneously the rule of fair contention can be guaranteed, and identical systems and different systems are allowed to have enough time to contend for resources.

The embodiment of the present document further discloses a computer program, including program instructions, which, when executed by a computer, enable the computer to be capable of executing any of the above methods for sending by occupying the unlicensed carrier.

The embodiment of the present document further discloses a carrier carrying the computer program.

Figure 3:
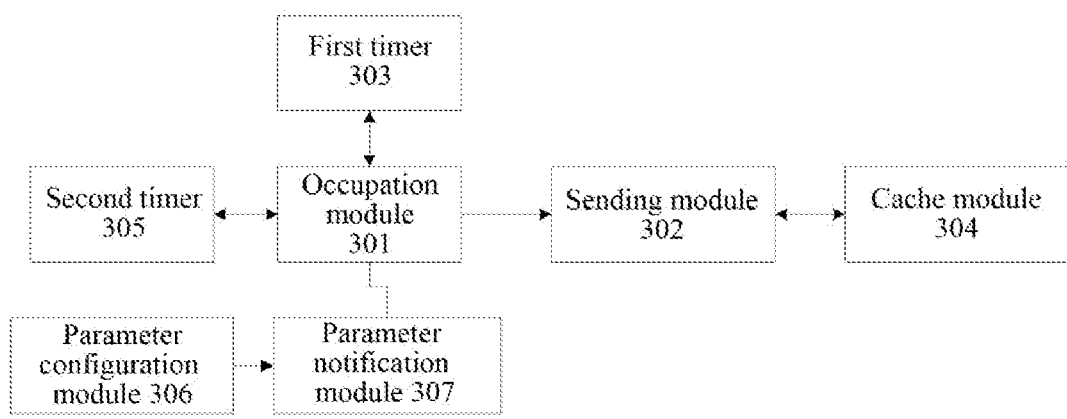
FIG. 3 illustrates a structural diagram of a device for sending by occupying an unlicensed carrier in embodiment 1 of the present document.

As illustrated in FIG. 3, this embodiment provides a device for sending by occupying an unlicensed carrier, which includes as follows.

An occupation module 301 is arranged to occupy an unlicensed carrier according to a continuous occupation mode.

A sending module 302 is arranged to send data and/or signals on the unlicensed carrier.

Herein, the occupation module 301 is arranged to occupy the unlicensed carrier according to the continuous occupation mode in accordance with the following mode:

setting one or more sub-occupation periods, wherein a time length of each sub-occupation period is smaller than or equal to the controlled maximum continuous occupation time length of the unlicensed carrier; and configuring a monitoring interval after each sub-occupation period.

The sending module 302 is arranged to send the data and/or signals on the unlicensed carrier according to the following mode:

sending data and/or signals on the unlicensed carrier occupied in the one or more sub-occupation periods and stopping sending the data and/or signals in the monitoring interval.

The access point is always kept to have an occupation and connection relationship with UE served by the access point within a continuous occupation period, herein the continuous occupation period refers to a time period that the access point actually occupies or virtually occupies the unlicensed carrier.

Herein, with respect to the continuous occupation mode, there may be four scenarios as follows.

Scenario 1

The occupation module 301 is further arranged to, if the sending module 302 completely sends the data and/or signals within one of the sub-occupation periods, the unlicensed carrier is released and continuous occupation at a current time is terminated.

The continuous occupation period includes an actual time length spent in completely sending the data and/or signals.

Scenario 2

The occupation module 301 is further arranged to, if the unlicensed carrier further needs to be continuously occupied after one of the sub-occupation periods is ended, and it is found that the unlicensed carrier is still idle or the unlicensed carrier is occupied again during a duration of the monitoring interval configured after the sub-occupation period, after the monitoring interval is ended, the sending module 302 is notified to continuously send the data and/or signals which are not completely sent in one or more sub-occupation periods after the monitoring interval.

The sending module 302 is further configured to, after a notification of the occupation module is received, continuously send the data and/or signals which are not completely sent within one or more sub-occupation periods after the monitoring interval; and The continuous occupation period includes a total time length of a plurality of sub-occupation periods and a plurality of monitoring intervals in which all data and/or signals are completely sent.

Scenario 3

The device further includes a first timer 303.

Herein the occupation module 301 is further arranged to, if the unlicensed carrier further needs to be continuously occupied after one of the sub-occupation periods is ended but the unlicensed carrier is not occupied again during a duration of the monitoring interval configured after the sub-occupation period, the first timer 303 is started after the monitoring interval is ended. And if the unlicensed carrier is occupied again within set time of the first timer 303, the sending module 302 is notified to continuously send the data and/or signals which are not completely sent within one or more subsequent sub-occupation periods.

The first timer 303 is arranged to, after started by the occupation module 301, start timing and notify the occupation module 301 after the set time is out;

The sending module 302 is further arranged to, after a notification of the occupation module 301 is received, continuously send the data and/or signals which are not completely sent within one or more subsequent sub-occupation periods.

The continuous occupation period includes a total time length of waiting time for waiting to preempt the unlicensed carrier again within the set time of the first timer 303, and a plurality of sub-occupation periods and a plurality of monitoring intervals in which all data and/or signals are completely sent.

Scenario 4

The occupation module 301 is further arranged to, if the unlicensed carrier is not occupied again within the set time of the first timer 303, terminate continuous occupation at a current time.

In addition, alternatively, the device further includes a cache module 304.

Herein the sending module 302 is further arranged to, if the sending module 302 has data and/or signals which are not sent before the monitoring interval, temporarily cache the data and/or signals in the cache module 304 and send the data and/or signals in a next sub-occupation period.

The cache module 302 is arranged to catch the data and/or signals which are not completely sent in the sending module 302.

In addition, alternatively, in the first three scenarios, the device further includes a second timer 305.

Herein the occupation module 301 is further arranged to start the second timer 305 after all data and/or signals are completely sent, judge whether there is a subsequent sending occupation demand within set time of the second timer 305. And if there is a subsequent sending occupation demand within the set time of the second timer 305 and the current sub-occupation period for occupying the unlicensed carrier is not ended, or the sub-occupation period is ended but the unlicensed carrier is occupied again, the unlicensed carrier is continuously occupied. Herein the continuous occupation period further includes waiting time for waiting an occupation demand within the set time of the second timer 305. And if there is no subsequent sending occupation demand within the set time of the second timer 305 or the sub-occupation period is ended but the unlicensed carrier is not occupied again, occupation at a current time is terminated.

The second timer 305 is arranged to, after started by the occupation module 301, start timing and notify the occupation module 301 after the set time is out.

In addition, the device further includes a parameter configuration module 306 and a parameter notification module 307. Herein the parameter configuration module 306 is arranged to, before the access point occupies the unlicensed carrier according to the continuous occupation mode, configure configuration parameters of the continuous occupation mode. Herein the configuration parameters of the continuous occupation mode include at least one or more of the following information: sub-occupation period, monitoring interval, set time of first timer, set time of second timer, predicted sending time length of data and predicted total time length of continuous occupation.

The parameter notification module 307 is configured to notify the served UE about the configuration parameters of the continuous occupation mode and an occupation situation, wherein the occupation situation includes that the unlicensed carrier is capable of being occupied and is not capable of being occupied.

Herein, the parameter notification module 307 is arranged to notify the served UE about the occupation situation according to the following mode.

The occupation situation is sent to the UE in an explicit or implicit mode when any one of the following situations occurs: a stage when a first sub-occupation period starts, after the monitoring interval is ended at each time, after waiting time within which the unlicensed carrier is preempted again in the set time of the first timer, when timing of the first timer 303 is completed, after waiting time within which a subsequent sending occupation demand is awaited and the sub-occupation period is not ended or the sub-occupation period is ended but the occupation module 301 preempts the unlicensed carrier again in the set time of the second timer 305, and when timing of the second timer is completed.

Herein the explicit mode includes that the parameter notification module carries information that indicates whether the unlicensed carrier is capable of being occupied in Downlink Control Information DCI or Media Access Control MAC signaling and sends the DCI or MAC signaling to the UE. And the implicit mode includes that, if it is found that the unlicensed carrier is still idle or the unlicensed carrier is occupied again, the parameter notification module sends a reference signal to the UE after any one of the situations occurs. And if the unlicensed carrier is not preempted, the parameter notification module does not send the reference signal.

Herein, the parameter notification module 307 is arranged to notify the served UE about the configuration parameters of the continuous occupation mode according to the following mode.

The parameter notification module 307 sends the configuration parameters of the continuous occupation mode to the UE through a licensed carrier or the preempted unlicensed carrier.

The parameter notification module 307 and the UE being uniformly preconfigured with partial configuration parameters, herein the partial configuration parameters include sub-occupation period, monitoring interval, set time of first timer and set time of second timer. And the parameter notification module 307 sends predicted sending time length of data and total time length of continuous occupation to the UE through a licensed carrier or the preempted unlicensed carrier.

Embodiment 2

Figure 4:
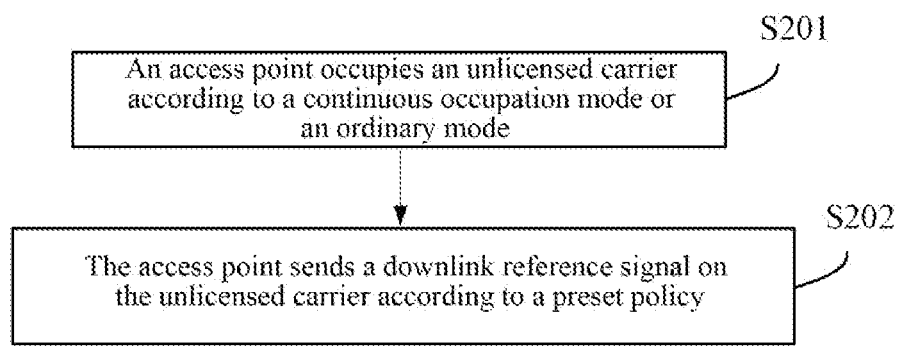
FIG. 4 illustrates a flowchart of a method for sending by occupying an unlicensed carrier in embodiment 2 of the present document.

As illustrated in FIG. 4, this embodiment provides a method for sending by occupying an unlicensed carrier, which includes the following steps.

In step S201, an access point occupies an unlicensed carrier according to a continuous occupation mode or an ordinary mode.

In step S202, the access point sends a downlink reference signal on the unlicensed carrier according to a preset policy.

Herein, the access point sends a downlink reference signal such as CSI-RS to the UE, the UE performs measurement after the CRI-RS is received to obtain Channel State Information CSI, then the CSI is reported to a base station or the access point, the time for UE to acquire the CSI is about 4 ms, scheduling time is 4 ms. In addition, the time needed for the access point to send the CSI-RS is further included while the longest preemption time of the unlicensed carrier is about tens of milliseconds (which are different in different regions), such as 32 ms. In order to quickly learn about the CSI situation, the time needed for processing operations such as synchronization and CSI acquisition other than data sending after the access point preempts a resource at each time is thereby reduced, and the spectrum use efficiency of a system is improved.

As an alternative mode, step S202 specifically includes the following operation.

The sending of the downlink reference signal for channel measurement is triggered on a first available subframe or a second available subframe of a first sub-occupation period of the unlicensed carrier.

Herein, the downlink reference signal includes Channel State Information-Reference Signal CSI-RS and Cell-specific Reference Signal CRS.

In other words, if an available subframe, i.e., the first subframe or the second subframe of the first sub-occupation period after the resource is preempted, is not a subframe, on which the CSI-RS is located, of the configured period, a periodic CSI-RS sending and aperiodic CSI reporting are triggered for one time.

Alternatively, after the sending of the downlink reference signal is triggered for one time on the first available subframe or the second available subframe of the first sub-occupation period of the preempted unlicensed carrier, the method further includes the following operation. The downlink reference signal is continuously sent in one or more next subframes for many times. By continuously sending a plurality of subframes, the UE is guaranteed not to have false detection or missed detection, and the accuracy of measurement can also be improved.

As an alternative mode, step S202 specifically includes the following operation.

An initial moment for sending the periodically sent downlink reference signal is adjusted to a first available subframe or a second available subframe of a first sub-occupation period of the preempted unlicensed carrier.

For example, if a sending period of the CSI-RS is 10 ms, specifically sent subframes are subframe 0, subframe 10, subframe 20, etc., and the preempted first available subframe is subframe 5 in a certain frame, so the specifically sent subframe of the CSI-RS may be adjusted to subframe 5, subframe 15, subframe 25, etc., i.e., the sending of the CSI-RS may be started from the first available subframe.

As an alternative mode, the method further includes the following operation.

If it is monitored that the unlicensed carrier is idle before the unlicensed carrier is preempted, the downlink reference signal is forcibly sent on the unlicensed carrier. Or regardless of whether it is monitored that the unlicensed carrier is idle, the downlink reference signal is forcibly sent on the unlicensed carrier.

As an alternative mode, the method further includes the following operation.

After the sending of the data and/or signals is stopped for a time length T, the access point performs data scheduling by using CSI reported by the UE at the most recent time. The range of the time length T is between 0 millisecond and tens of milliseconds. If the time length T exceeds this range, this method cannot be applied.

Here, the time length T in which the sending of the data and/or signals is stopped refers to that the unlicensed carrier is released as soon as the data are completely sent. It the access point further needs to occupy the unlicensed carrier after the time length T and T satisfies the above-mentioned range, at this moment the access point may use the CSI reported by the UE at the most recent time. For another example, if the unlicensed carrier is preempted away within the monitoring interval, the unlicensed carrier is preempted back within the set time of the first timer and the sending of the data is stopped for the time length T, at this moment the access point may use the CSI reported by the UE at the most recent time.

In addition, after the unlicensed carrier resource is preempted, certain time needs to be spent at an initial stage to perform channel measurement to perform work such as synchronization. In order to prevent the resource from being wasted, a small data block may be sent at this time period at the initial stage. For example, Transmission Mode 1 TM1 and TM2 are used as sending modes, and a conservative coding modulation solution is adopted during sending, i.e., a low-order modulation mode and a low-coding-rate coding mode are used. For example, QPSK and ⅓ coding modes are used. As compared with 16QAM/64QAM modulation mode and ½ coding mode, this coding modulation mode is a conservative mode. Hybrid Automatic Repeat Request HARQ is adopted to guarantee initial sending performance.

The embodiment of the present document further discloses a computer program, including program instructions, which, when executed by a computer, enable the computer to be capable of executing the method for sending by occupying the unlicensed carrier as illustrated in FIG. 4.

The embodiment of the present document further discloses a carrier carrying the computer program.

Figure 5:
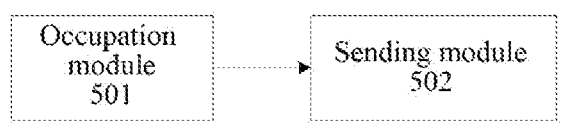
FIG. 5 illustrates a structural diagram of a device for sending by occupying an unlicensed carrier in embodiment 2 of the present document.

As illustrated in FIG. 5, the present embodiment provides a device for sending by occupying an unlicensed carrier, which includes the following modules.

An occupation module 501 is arranged to occupy the unlicensed carrier according to the continuous occupation mode or an ordinary mode.

A sending module 502 is arranged to send a downlink reference signal on the unlicensed carrier according to a preset policy.

Herein, as an alternative mode, the sending module 502 is arranged to send the downlink reference signal on the unlicensed carrier according to the preset policy in accordance with the following mode.

The sending of the downlink reference signal is triggered for channel measurement on the first available subframe or the second available subframe of the first sub-occupation period of the unlicensed carrier.

Herein, the sending module 502 is further arranged to, after the sending of the downlink reference signal is triggered for one time on the first available subframe or the second available subframe of the first sub-occupation period of the unlicensed carrier, continuously send the downlink reference signal in one or more next subframes for many times.

Herein, as another alternative mode, the sending module 502 is arranged to send the downlink reference on the unlicensed carrier according to the preset policy in accordance with the following mode.

An initial moment for sending the periodically sent downlink reference signal is adjusted to a first available subframe or a second available subframe of a first sub-occupation period of the unlicensed carrier.

In addition, the sending module 502 is further arranged to, if it is monitored that the unlicensed carrier is idle before the unlicensed carrier is occupied, forcibly send the downlink reference signal on the unlicensed carrier, or forcibly send the downlink reference signal on the unlicensed carrier regardless of whether it is monitored that the unlicensed carrier is idle.

Herein, the downlink reference signal includes Channel State Information-Reference Signal CSI-RS and Cell-specific Reference Signal CRS.

In addition, the present device further includes a channel modulation module arranged to, after the sending of the data and/or signals is stopped for a preset time period, perform data channel coding modulation by using CSI reported by the UE at the most recent time.

In addition, the present embodiment further provides an access point, including the devices for sending by occupying the unlicensed carrier in embodiment 1 and embodiment 2.

From the above-mentioned embodiments, it can be seen that, as compared with the related technology, according to the method and system for sending by occupying the unlicensed carrier and the access point provided by the above-mentioned embodiments, the access point uses the contended unlicensed carrier by adopting the continuous occupation mode, the access point and the UE served by the access point are always kept to have a connection relationship within the continuous occupation period, so that the occupation time length for sending data at each time, i.e., sub-occupation period, can be prevented from exceeding the maximum continuous occupation time length which is controlled by the country. Simultaneously, after the sub-occupation period (or the maximum continuous occupation time length controlled by the country) is ended at each time, the occupation and connection relationship with the UE does not need to be immediately released, thereby the access point does not need to spend time in reestablishing a connection with the UE, e.g., synchronization or measurement time, thereby reducing the time needed for the access point to process operations (such as synchronization, UE measurement and CSI reporting, etc.) other than data sending after the access point preempts the resource at each time. During the monitoring interval, the access point keeps the unchanged connection relationship with the UE, forming virtual occupation on the unlicensed carrier, temporarily not sending uplink and downlink signal, so as to avoid contending or preempting for other access points, so that the rule of fair contention can be guaranteed, and identical systems and different systems are allowed to have enough time to contend for resources.

One skilled in the art can understand that all or partial steps in the above-mentioned methods may be completed by relevant hardware instructed by a program, and the program may be stored in a computer readable storage medium such as a read-only memory, a magnetic disc or a compact disc, etc. Alternatively, all or partial steps in the above-mentioned embodiments may also be implemented by using one or more integrated circuits. Correspondingly, each module/unit in the above-mentioned embodiments may be implemented by means of hardware and may also be implemented by means of a software function module. The embodiments of the present document are not limited to the combinations of hardware and software in any specific form.

The above-mentioned embodiments are just specific embodiments of the present document and shall not hereby limit the protection scope of the present document. There may be other various embodiments according to the contents of the present document. One skilled in the art may make various corresponding modifications and variations according to the present document without departing from the spirit and essence of the present document. However, any modifications, equivalent replacements, improvements and the like made within the spirit and rule of the present document shall be all included in the protection scope of the present document.

INDUSTRIAL APPLICABILITY

According to the method and system for sending data and/or signals by occupying the unlicensed carrier and the access point provided by the technical solution of the present document, the access point uses the contended unlicensed carrier by adopting the continuous occupation mode, the access point and the UE served by the access point are always kept to have a connection relationship within the continuous occupation period, so that the occupation time length for sending data at each time, i.e., sub-occupation period, can be prevented from exceeding the maximum continuous occupation time length which is controlled by the country. Simultaneously, after the sub-occupation period (or the maximum continuous occupation time length controlled by the country) is ended at each time, the occupation and connection relationship with the UE does not need to be immediately released, thereby the access point does not need to spend time in reestablishing a connection with the UE, e.g., synchronization or measurement time, thereby reducing the time needed for the access point to process operations (such as synchronization, UE measurement and CSI reporting, etc.) other than data sending after the access point preempts the resource at each time. During the monitoring interval, the access point keeps the unchanged connection relationship with the UE, forming virtual occupation on the unlicensed carrier, temporarily not sending uplink and downlink signal, so as to avoid contending or preempting for other access points, so that the rule of fair contention can be guaranteed, and identical systems and different systems are allowed to have enough time to contend for resources. Therefore, the present document has very strong industrial applicability.

The invention claimed is:

1. A method for sending by occupying an unlicensed carrier, comprising:
  occupying, by an access point, an unlicensed carrier according to a continuous occupation mode and sending data and/or signals on the unlicensed carrier;
  wherein the step of occupying, by the access point, the unlicensed carrier according to the continuous occupation mode and sending the data and/or signals on the unlicensed carrier comprises:
  setting one or more sub-occupation periods and configuring one monitoring interval after each sub-occupation period; and
  sending data and/or signals on the unlicensed carrier occupied within the one or more sub-occupation periods and stopping sending the data and/or signals within the monitoring interval; and
  the access point actually occupying or virtually occupying the unlicensed carrier within a continuous occupation period;
  if the access point and/or the UE completely sends the data and/or signals within one sub-occupation period, releasing the unlicensed carrier and the access point terminating continuous occupation at a current time; and a time length of the continuous occupation period is equal to a predicted sending time length of the data;
  if the unlicensed carrier further needs to be continuously occupied after one sub-occupation period is ended and the access point finds that the unlicensed carrier is still idle during a duration of the monitoring interval configured after the sub-occupation period or the access point preempts the unlicensed carrier again, then after the monitoring interval is ended, the access point continuously sending the data and/or signals which are not completely sent within one or more sub-occupation periods after the monitoring interval; and the time length of the continuous occupation period is equal to a total of the predicted sending time length of the data and multiple monitoring intervals during data transmission.

2. The method for sending by occupying the unlicensed carrier according to claim 1, wherein the step of occupying, by the access point, the unlicensed carrier according to the continuous occupation mode and sending the data and/or signals on the unlicensed carrier further comprises:

if the unlicensed carrier further needs to be continuously occupied after one sub-occupation period is ended but the access point does not preempt the unlicensed carrier again during a duration of the monitoring interval configured after that sub-occupation period, starting a first timer after that monitoring interval is ended, and if the access point preempts the unlicensed carrier again within set time of the first timer, the access point and/or the UE continuously sending the data and/or signals which are not completely sent within one or more subsequent sub-occupation periods; and the time length of the continuous occupation period is equal to a total of a time length of waiting time for waiting to preempt the unlicensed carrier again within the set time of the first timer, and the predicted sending time length of the data and multiple monitoring intervals during data transmission.

3. The method for sending by occupying the unlicensed carrier according to claim 2, wherein the method further comprises:

the access point starting a second timer after all data and/or signals are completely sent, judging whether there is a subsequent sending occupation demand within set time of the second timer, and if there is a subsequent sending occupation demand within the set time of the second timer and a current sub-occupation period for occupying the unlicensed carrier is not ended or the sub-occupation period is ended but the access point preempts the unlicensed carrier again, continuously occupying, wherein the continuous occupation period further comprises waiting time for waiting an occupation demand within the set time of the second timer; and if there is no subsequent sending occupation demand within the set time of the second timer or the sub-occupation period is ended but the access point does not preempt the unlicensed carrier again, the access point terminating occupation at a current time.

4. The method for sending by occupying the unlicensed carrier according to claim 3, wherein, before the access point occupies the unlicensed carrier according to the continuous occupation mode, the method further comprises: configuring configuration parameters of the continuous occupation mode, wherein the configuration parameters of the continuous occupation mode comprise one or more of the following information: sub-occupation period, monitoring interval, set time of first timer, set time of second timer, predicted sending time length of data and predicted total time length of continuous occupation; wherein the method further comprises: the access point notifying the UE served by the access point about the configuration parameters of the continuous occupation mode and an occupation situation, wherein the occupation situation comprises that the unlicensed carrier is capable of being occupied and is not capable of being occupied; wherein the step of the access point notifying the UE served by the access point about the occupation situation comprises: the access point sending the occupation situation to the UE in an explicit or implicit mode when any one of the following situations occurs: a stage when a first sub-occupation period starts, after the monitoring interval is ended at each time, after waiting time within which the unlicensed carrier is preempted again in the set time of the first timer, when timing of the first timer is completed, after waiting time within which a subsequent sending occupation demand is awaited and the sub-occupation period is not ended or the sub-occupation period is ended but the access point preempts the unlicensed carrier again in the set time of the second timer, and when timing of the second timer is completed, wherein the explicit mode comprises: the access point carries information that indicates whether the unlicensed carrier is capable of being occupied in Downlink Control Information, DCI, or Media Access Control, MAC, signaling and sends to the UE, and the implicit mode comprises: if the access point finds that the unlicensed carrier is still idle or the access point preempts the unlicensed carrier again, the access point sends a reference signal to the UE after any one of the situations occurs, and if the access point does not preempt the unlicensed carrier, the reference signal is not sent, wherein the method further comprises: if the unlicensed carrier further needs to be continuously occupied after one sub-occupation period is ended but the access point does not preempt the unlicensed carrier again within duration of the monitoring interval, the access point carrying information that indicates the UE to start the first timer in DCI or MAC signaling and sending to the UE; or after all data and/or signals are completely sent, the access point carrying information that indicates the UE to start the second timer in DCI or MAC signaling and sending to the UE.

5. The method for sending by occupying the unlicensed carrier according to claim 4, wherein the step of the access point notifying the UE served by the access point about the configuration parameters of the continuous occupation mode comprises:

the access point sending the configuration parameters of the continuous occupation mode to the UE through a licensed carrier or the preempted unlicensed carrier; or the access point and the UE being uniformly preconfigured with partial configuration parameters, wherein the partial configuration parameters comprise: sub-occupation period, monitoring interval, set time of first timer and set time of second timer; and the access point sending predicted sending time length of data and predicted total time length of continuous occupation to the UE through a licensed carrier or the preempted unlicensed carrier.

6. A device for sending by occupying an unlicensed carrier, comprising hardware performing instructions stored in a non-transitory computer readable medium which executes steps in following modules: an occupation module and a sending module, wherein:

the occupation module is arranged to occupy an unlicensed carrier according to a continuous occupation mode; and the sending module is arranged to send data and/or signals on the unlicensed carrier;

wherein the occupation module is arranged to occupy the unlicensed carrier according to the continuous occupation mode according to a following mode: setting one or more sub-occupation periods and configuring a monitoring interval after each sub-occupation period;

the sending module is arranged to send the data and/or signals on the unlicensed carrier according to a following mode:

sending data and/or signals on the unlicensed carrier occupied within the one or more sub-occupation periods and stopping sending the data and/or signals within the monitoring interval; and the occupation module is arranged to actually occupy or virtually occupy the unlicensed carrier within a continuous occupation period;

wherein the occupation module is further arranged to, if the sending module completely sends the data and/or signals within one sub-occupation period, release the unlicensed carrier and terminate continuous occupation at a current time; and a time length of the continuous occupation period is equal to a predicted sending time length of the data;

wherein the occupation module is further arranged to, if the unlicensed carrier further needs to be continuously occupied after one sub-occupation period is ended and it is found that the unlicensed carrier is still idle or the unlicensed carrier is occupied again within a duration of the monitoring interval configured after the sub-occupation period, after the monitoring interval is ended, notify the sending module to continuously send the data and/or signals which are not completely sent within one or more sub-occupation periods after the monitoring interval;

the sending module is further arranged to, after a notification of the occupation module is received, continuously send the data and/or signals which are not completely sent within one or more sub-occupation periods after the monitoring interval; and the time length of the continuous occupation period is equal to a total of the predicted sending time length of the data and multiple monitoring intervals during data transmission.

7. The device for sending by occupying the unlicensed carrier according to claim 6, wherein the hardware further executes steps in a first timer, the occupation module is further arranged to, if the unlicensed carrier further needs to be continuously occupied after one sub-occupation period is ended but the unlicensed carrier is not occupied again within a duration of the monitoring interval configured after the sub-occupation period, start the first timer after the monitoring interval is ended, and if the unlicensed carrier is occupied again in set time of the first timer, notify the sending module to continuously send the data and/or signals which are not completely sent within one or more subsequent sub-occupation periods;

the first timer is arranged to, after started by the occupation module, start timing and notify the occupation module after the set time is out; and the sending module is further arranged to, after a notification of the occupation module is received, continuously send the data and/or signals which are not completely sent within one or more subsequent sub-occupation periods, wherein the time length of the continuous occupation period is equal to a total of a time length of waiting time for waiting to preempt the unlicensed carrier again within the set time of the first timer, and the predicted sending time length of the data and multiple monitoring intervals during data transmission.

8. The device for sending by occupying the unlicensed carrier according to claim 7, wherein the hardware further executes steps in a second timer, wherein:

the occupation module is further arranged to start the second timer after all data and/or signals are completely sent, judge whether there is a subsequent sending occupation demand within set time of the second timer, and if there is a subsequent sending occupation demand within the set time of the second timer, and the current sub-occupation period for occupying the unlicensed carrier is not ended or the sub-occupation period is ended but the unlicensed carrier is occupied again, continuously occupy the unlicensed carrier, wherein the continuous occupation period further comprises waiting time for waiting an occupation demand in the set time of the second timer; and if there is no subsequent sending occupation demand within the set time of the second timer or the sub-occupation period is ended but the unlicensed carrier is not occupied again, terminate occupation at a current time; and the second timer is arranged to, after started by the occupation module, start timing and notify the occupation module after the set time is out.

9. The device for sending by occupying the unlicensed carrier according to claim 6, wherein the hardware further executes steps in following modules: a parameter configuration module and a parameter notification module, wherein:

the parameter configuration module is arranged to, before the access point occupies the unlicensed carrier according to the continuous occupation mode, configure configuration parameters of the continuous occupation mode, wherein the configuration parameters of the continuous occupation mode comprise one or more of the following information: sub-occupation period, monitoring interval, set time of first timer, set time of second timer, predicted sending time length of data and predicted total time length of continuous occupation; and the parameter notification module is arranged to notify the UE served by the access point about the configuration parameters of the continuous occupation mode and an occupation situation, wherein the occupation situation comprises that the unlicensed carrier is capable of being occupied and is not capable of being occupied;

wherein the parameter notification module is arranged to notify the UE served by the access point about the occupation situation according to the following mode:

sending the occupation situation to the UE in an explicit or implicit mode when any one of the following situations occurs: a stage when a first sub-occupation period starts, after the monitoring interval is ended at each time, after waiting time within which the unlicensed carrier is preempted again in the set time of the first timer, when timing of the first timer is completed, after waiting time within which a subsequent sending occupation demand is awaited and the sub-occupation period is not ended or the sub-occupation period is ended but the occupation module preempts the unlicensed carrier again in the set time of the second timer, and when timing of the second timer is completed, wherein the explicit mode comprises that: the parameter notification module carries information that indicates whether the unlicensed carrier is capable of being occupied in Downlink Control Information, DCI, or Media Access Control, MAC, signaling and sends to the UE, and the implicit mode comprises that: if it is found that the unlicensed carrier is still idle or the unlicensed carrier is occupied again, the parameter notification module sends a reference signal to the UE after any one of the situations occurs, and if the unlicensed carrier is not preempted, the reference signal will not be sent;

wherein the parameter notification module is arranged to notify the UE served by the access point about the configuration parameters of the continuous occupation mode according to the following mode:

the parameter notification module sending the configuration parameters of the continuous occupation mode to the UE through a licensed carrier or the preempted unlicensed carrier; or the parameter notification module and the UE being uniformly preconfigured with partial configuration parameters, wherein the partial configuration parameters comprise: sub-occupation period, monitoring interval, set time of first timer and set time of second timer; and the parameter configuration module sending predicted sending time length of data and total time length of continuous occupation to the UE through a licensed carrier or the preempted unlicensed carrier.

* * * * *